United States Patent
Leddy

(10) Patent No.: US 11,830,285 B2
(45) Date of Patent: *Nov. 28, 2023

(54) SYSTEM AND METHOD FOR ACCOUNT VERIFICATION BY AERIAL DRONE

(71) Applicant: VISA INTERNATIONAL SERVICE ASSOCIATION, San Francisco, CA (US)

(72) Inventor: William Leddy, Lakeway, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/104,606

(22) Filed: Feb. 1, 2023

(65) Prior Publication Data

US 2023/0177872 A1 Jun. 8, 2023

Related U.S. Application Data

(63) Continuation of application No. 17/276,428, filed as application No. PCT/US2018/051360 on Sep. 17, 2018, now Pat. No. 11,600,110.

(51) Int. Cl.
*G06V 40/16* (2022.01)
*H04W 4/80* (2018.01)
*G06V 20/13* (2022.01)
*B64C 39/02* (2023.01)
*B64U 101/30* (2023.01)

(52) U.S. Cl.
CPC .......... *G06V 40/166* (2022.01); *B64C 39/024* (2013.01); *G06V 20/13* (2022.01); *H04W 4/80* (2018.02); *B64U 2101/30* (2023.01)

(58) Field of Classification Search
CPC ....... G06V 40/166; G06V 20/13; H04W 4/80; B64C 39/024
See application file for complete search history.

(56) References Cited

U.S. PATENT DOCUMENTS

| | | |
|---|---|---|
| 9,426,139 B1 | 8/2016 | McClintock |
| 9,643,722 B1 | 5/2017 | Myslinski |
| 11,157,907 B1 | 10/2021 | Kumar |
| 11,600,110 B2 | 3/2023 | Leddy |

(Continued)

FOREIGN PATENT DOCUMENTS

KR 20180046149 A 5/2018

OTHER PUBLICATIONS

International Search Report and Written Opinion of International Application No. PCT/US2018/051360, dated Nov. 15, 2018, 9 pages.

(Continued)

*Primary Examiner* — David Bilodeau
(74) *Attorney, Agent, or Firm* — K&L Gates LLP

(57) ABSTRACT

A verification application executing at a user's mobile phone directs the user to take a photo of an identification document (e.g., driver's license or other form of government issued identification) or of their face. After the verification application sends the image to a backend service, the service may then dispatch a drone to the user's location and take a photograph of the user. The service may then validate the previously-imaged document or photo of the user's face against the photograph of the user and the geolocation sent with the first image. The service may then verify the new account and provision a token to the verification application to complete a secured account generation.

19 Claims, 4 Drawing Sheets

(56) References Cited

U.S. PATENT DOCUMENTS

| | | |
|---|---|---|
| 2017/0330028 A1 | 11/2017 | Lo |
| 2017/0373852 A1 | 12/2017 | Cassin |
| 2018/0053139 A1 | 2/2018 | Stoman |
| 2022/0036044 A1 | 2/2022 | Leddy |

OTHER PUBLICATIONS

Office Action (Non-Final Rejection) dated Jul. 11, 2022 for U.S. Appl. No. 17/276,428 (pp. 1-10).
Office Action (Notice of Allowance and Fees Due (PTOL-85)) dated Nov. 1, 2022 for U.S. Appl. No. 17/276,428 (pp. 1-5).

SYSTEM AND METHOD FOR ACCOUNT VERIFICATION BY AERIAL DRONE

CROSS-REFERENCE TO RELATED APPLICATIONS

This application is a continuation of U.S. application Ser. No. 17/276,428, filed on Mar. 15, 2021, which is a national stage entry under 35 U.S.C. 371 of International Patent Application No. PCT/US2018/051360, filed on Sep. 17, 2018, the disclosure of which is incorporated by reference herein in its entirety.

BACKGROUND

Unmanned aerial vehicles or "drones" have seen increased use since the late 1990s as improvements in electric motors and electronics have made their design and use more feasible in a variety of roles. Typical drone design includes "quadcopter" models with four rotors providing lift and thrust for the vehicle and a suite of mechanical and electronic components such as cameras, transceivers, processors, cargo bays, articulating arms, etc. These components are used by the drone to capture or deliver objects, images, and data during its flight.

Online account generation has become a relatively simple task. However, verifying the identity of the person for whom the account was created has not. As online fraud becomes more and more prevalent, identity proofing must also become more sophisticated to ensure account information given during registration is legitimate.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

The present disclosure provides a technical solution to the technical problem of identity proofing an online account for a network data system by drone. A drone may be configured to foil would-be thieves who use stolen identity information, stolen images from social media or even "friendly" fraud, spoofed documents, and faked geolocations. Generally, the solution provides an improvement to past information and personal verification techniques by employing a drone that is specifically configured to verify an applicant's identity by travelling to the person creating the account and completing several novel identity verification procedures. The drone may be configured to: measure a legitimate geolocation by flying to the location of an account creator to capture a trusted location, capture verification data such as a photograph of a facial image by a drone's camera (a trusted image), record the applicant's voice using a drone's microphone to capture a trusted voice, and employ phone verification by flying to the account creator, calling the given phone number, and causing it to play a particular tone to verify the account creator is in possession of the phone number given during the enrollment process.

In some embodiments, a user may first download a verification app (e.g., the issuer system module 105E, as described below) or be directed to a verification process during online account generation and enrollment. Using the app or service, the user may take a photo of an identification document (e.g., driver's license or other form of government issued identification) or of their face, record their voice, take an iris scan, or other action to identify themselves. After the verification app sends the data and a geolocation of where the data was captured to a backend, a service may then dispatch a drone to the applicant's location and capture verification data for the user. The service may then validate the previously-acquired application data against the verification data captured by the drone and the geolocation. The service may then verify the new user account and provision a token to the verification app to complete a secured account generation.

In other embodiments, a computer-implemented method of verifying application data may include receiving application data from a remote computer system at an issuer computer system and determining identification data and geolocation data from the application data. The method may then pass the geolocation data to a drone control system that is remote from the issuer computer system and cause a drone system to be dispatched to the geolocation. The drone system may then obtain verification data at the geolocation. The method may then receive an indication of a match between the identification data and the verification data and issue a token via the issuer computer system, wherein the token includes an encrypted identifier that may be mapped to a personal account number.

In further embodiments, a system for verifying new user account identification in a network data system may include an issuer system including a first processor and a first memory hosting an issuer account generation module and a verification module. The issuer account generation module and the verification module may include instructions stored on the first memory for execution by the first processor. The instructions stored in the first memory may include instructions for receiving application data from a user computer system that is remote from the issuer system and determining identification data and geolocation data from the application data. Further instructions may pass the geolocation data to a drone control system that is remote from the issuer computer system, cause a drone system to be dispatched to the geolocation, and cause the drone system to obtain verification data at the geolocation, wherein a type of the verification data is identical to a type of the identification data. The issuer account generation module may then receive an indication of a match between the identification data and the verification data. The system may also include a payment network system including a second processor and a second memory hosting a payment network module. The payment network module may include instructions stored on the second memory for execution by the second processor for generating a token in response to receiving the indication of the match between the identification data and the verification data, and then causing the token to be saved at the user computer system, wherein the token includes an encrypted identifier that may be mapped to a personal account number.

BRIEF DESCRIPTION OF THE FIGURES

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

Specification

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, components, or devices. Accordingly, the present invention may take the form of an entirely hardware embodiment, an entirely software embodiment, or an embodiment combining software and hardware aspects. The following detailed description is, therefore, not to be taken in a limiting sense.

Figure 1:
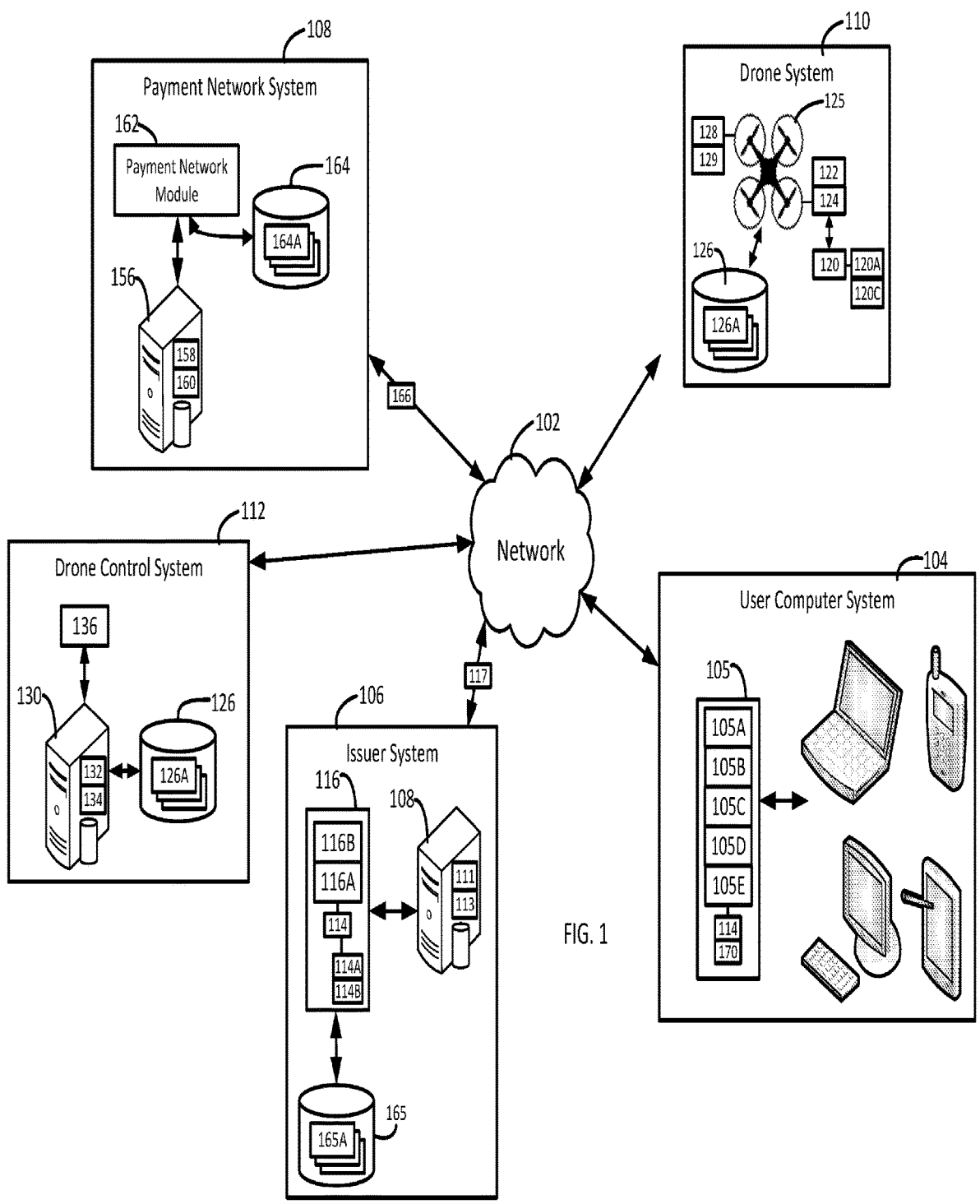
FIG. 1 shows an illustration of an exemplary drone-based verification system for online account generation.

FIG. 1 generally illustrates one embodiment of a drone-based verification system 100 for identifying and authenticating the identification person. In some embodiments, the system 100 may be used to verify the identity of a potential account holder for a payment device 200 (FIGS. 2A and 2B) in a network data system. In other embodiments, the system 100 may be used for any identity verification or for attestation of attributes such as age of a person. The system 100 may include a computer network 102 that links one or more systems and computer components. In some embodiments, the system 100 may include a user computer system 104, an issuer system 106, a payment network system 108, a drone system 110, and a drone control system 112.

The network 102 may be described variously as a communication link, computer network, internet connection, etc. The system 100 may include various software or computer-executable instructions or components stored on tangible memories and specialized hardware components or modules that employ the software and instructions to verify the identity of a potential account holder for an account linked to a payment device 200 (FIGS. 2A and 2B) issued by the issuer system 106 using the drone system 110, as described herein.

The various modules may be implemented as computer-readable storage memories containing computer-readable instructions (i.e., software) for execution by one or more processors of the system 100 within a specialized or unique computing device. The modules may perform the various tasks, methods, modules, etc., as described herein. The system 100 may also include both hardware and software applications, as well as various data communications channels for communicating data between the various specialized and unique hardware and software components.

Networks are commonly thought to comprise the interconnection and interoperation of hardware, data, and other entities. A computer network, or data network, is a digital telecommunications network which allows nodes to share resources. In computer networks, computing devices exchange data with each other using connections, i.e., data links, between nodes. Hardware networks, for example, may include clients, servers, and intermediary nodes in a graph topology. In a similar fashion, data networks may include data nodes in a graph topology where each node includes related or linked information, software methods, and other data.

It should be noted that the term "server" as used throughout this application refers generally to a computer, other device, program, or combination thereof that processes and responds to the requests of remote users across a communications network (e.g., network 102). Servers serve their information to requesting "clients." The term "client" as used herein refers generally to a computer, program, other device, user and/or combination thereof that is capable of processing and making requests and obtaining and processing any responses from servers across a communications or data network. A computer, other device, set of related data, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

A user computer system 104 may include a processor 104A and memory 104B. The user computing system 104 may include a server, a mobile computing device, a smartphone, a tablet computer, a Wi-Fi-enabled device or other personal computing device capable of wireless or wired communication, a thin client, or other known type of computing device. The memory 104B may include various modules 105 including instructions that, when executed by the processor 104A control the functions of the user computer system generally and integrate the user computer system 104 into the system 100 in particular to verify the identity of a user. In some embodiments, the system 100 may be employed while creating a payment network account 164A within the payment network system 108 that is linked to an issuer account 174A within the issuer system 106. For example, some modules may include an operating system 105A, a browser module 105b, a communication module 105C, an electronic wallet module 105D, and an issuer system module 105E. In some embodiments, the issuer system module 105E and its functions described herein may be incorporated as one or more modules of the user computer system 104. In other embodiments, the issuer system module 105E and its functions described herein may be incorporated as one or more sub-modules of the payment network system 108, the issuer system 106, and/or the drone control system 112.

In some embodiments, the issuer system module 105E may pass user application data 114 to other components of the system 100 to facilitate identity verification to create a payment network account 164A and/or a new user issuer account 165A. For example, one or more of the operating system 105A, browser module 105B, communication module 105C, electronic wallet module 105D, and issuer system module 105E may execute instructions to pass data to the issuer system 106 and/or the payment network system 108 to facilitate creating and verifying a new payment network account 164A and/or a new user issuer account 165A. Application data 114 passed from the user computer system to other components of the system may include an identification document image, a selfie, a voice recording of the new user applicant, a phone number, and other data. For example, the application data 114 may include identification data 114A and geolocation data 114B. In further embodiments, the functions of the issuer system module 105E as described herein may be implemented on the issuer system 106 and accessible by the user computer system 104 as a website or other remotely-accessible functionality.

The issuer system 106 may include a computing device such as an issuer server 108 including a processor 111 and memory 113 including components to facilitate creating and verifying new user issuer account data 165A that is linked to a user payment network account 164A. In some embodiments, the issuer server 108 may include one or more modules 116 stored on the memory 113 including instructions that, when executed by the processor 111 provision an application such as the issuer system module 105E to a user computer system 104 and receive user application data 114 from the module 105E via the network 102. The user application data 114 may be sent from the user computer system 104 and the issuer system module 105E in response to various prompts by the module 105E that are displayed within a graphical user interface on the computer system 104. For example, an issuer account generation module 116A may be stored in the memory 113 and include instructions executed by the processor 111 to receive the user application data 114 from the user computer system 104 that executes the issuer system module 105E. A verification module 116B may also receive the user application data 114 from the user computer system 104. The verification module 116B may include instructions stored in the memory 112 and executed by the processor 111 to communicate with a drone control system 112. In some embodiments, the verification module 116B may send a verification request 117 to the drone control system 112 to verify a portion of the received user application data 114.

In some embodiments, the verification module 116B may include instructions to dispatch the drone system 110 for verification of user identification to create a new account. For example, the verification module 116B may include instructions to execute the following actions:

```
Int NewAccountRequest(Image docImage, GeoLocation where)
{
Address address = docReadingService.getAddress(docImage); // read the user address from doc
int addrScore = scoreAddressMatch(address, where); // Score the current location with the doc location
                                                    // could use geofencing
if (addrScore > matchThreshold)
  {
   int waitTime = dispatchService(where); // send a drone and get the estimated wait time for the arrival
   return waitTime;
  }
  else
  {
   return ERROR_LOCATION_MISMATCH;
  }
}
```

The drone control system 112 may then cause a drone system 110 to travel to a user location and gather and communicate that verification data 126A back to other components of the system 100 (e.g., the drone control system 112, the issuer system 106, etc.), as described herein. In some embodiments, the issuer system module 105E includes instructions to act as a beacon for the drone system 110 via Bluetooth® or other form of short-range communication protocol between the user computer system 104 and the drone system 110. A portion of the user application data 114 may include geolocation data. The verification module 116B may forward the geolocation data as part of the verification request 117 to the drone control system 112 or another system which then causes the drone system 110 to execute one or more protocols to verify some or all of the user application data 114. In some embodiments, the drone system 110 may store the verification data 126A within a verification data repository 126. In other embodiments, the verification data 126A may be sent to other components of the system 100 without being stored at the drone system 110. Alternatively or in addition, the drone control system 112 may store the verification data 126A within a verification data repository 126 at the drone control system 112. The verification data 126 may be encrypted as part of the verification data gathering process.

The drone control system 112 may include a computing device such as a drone control server 130 including a processor 132 and memory 134 storing components to facilitate communicating instructions to a drone system 110 in response to receiving a verification request 117 from the issuer system 106. A drone control module 136 may include instructions to send geolocation data to the drone system 110 that was received by the issuer system 106 from the user computer system 104. The drone control module 136 may also include instructions to cause the drone system 110 to execute one or more data retrieval methods or protocols 120 to obtain verification data 126A, communicate the verification data 126A to the issuer system 106 via the network 102 to allow the issuer system 106 to verify the user application data 114 that was received by the issuer system 106 when a user computer system 104 created an online account with the issuer system 106. In some embodiments, the data retrieval protocol 120 may be used to issue a new credit card (e.g., the payment device 200), open a new loan account, facilitate lost account information for a user, and authenticate high-value or unusual transactions for any particular user with the payment device 200.

In some embodiments, a data retrieval protocol 120 may include causing the drone system 110 to fly to the geolocation identified by the geolocation data in response to one or more instructions from the drone control system 112. The data retrieval protocol 120 may also include instructions to receive a signal from the user computer system 104 (e.g., a Bluetooth® or other type of short-range signal) when the user computer system 104 act as a beacon for the drone system 110. The drone system 110 may then execute one or more instructions of the protocol 120 using a processor 122 and memory 124 of the drone 125 to verify the user application data 114. The actions may include taking a photo of one or more people at the geolocation, taking a recording of a voice of a person at the geolocation, receiving a photo identification (e.g., driver's license, passport, etc.) or taking a photo of the identification from a user at the geolocation, and other actions related to verifying the identification of a potential account holder with the issuer system 106 based on data shared by the user computer system 104 to the issuer system 106 during a new account setup process.

In some embodiments, the drone system 110 may be used as a Bluetooth® Low Energy beacon to facilitate location of the user for verification and account creation, the data retrieval protocol 120 may include instructions such as:

```
Int FindUser(UserMobile phone, GeoLocation where)
{
  int result = 0;
  drone.flyTo(where);          // go to the location first
  int OTP = generateRandomOTP( );   // create a sync code for this
interaction
  phone.syncCode(OTP);         // tell the user's mobile app that we
have arrived with a push notification
                               // deliver the one time code
    bluetooth.beaconOn( );
    while (int result = Bluetooth.getCode( ))
    {
      if (result == OTP) result = success;
    }
}
```

One or more modules of the system 100 (e.g., the drone control module 136, the verification module 116A, or other module) may then compare the user application data 114 to the verification data 126A gathered by the drone system 110. Once the issuer system 106 receives an indication that the user application data 114 has been verified by comparison to the verification data 126A, the issuer system 106 may generate a new user issuer account 165A for storage in the issuer account repository 165.

In some embodiments, the data retrieval protocol 120 may include a matching algorithm 120A that may include instructions to use face recognition technology to verify a potential user for a new account, voice recognition technology to verify the user, iris recognition, fingerprint identification, and other technologies to identify a person through images, biometrics, and other data. In other embodiments, the drone control system 112 or other component of the system 100 may include the matching algorithm. For example, the matching algorithm 120A may use the received user application data 114 and verification data 1266 captured by a data receiving device 128 of the drone system 110 to verify user identification for a new account.

In some embodiments, the data receiving device 128 may include a camera, a microphone, a secure device to receive and/or image trusted documents, etc. In further embodiments, the matching algorithm 120A may be a sub-component of another component of the system 100 such as the drone control system 112, or a stand-alone component that is remote from the drone control system 112, the issuer system 106, etc. For example, the system 100 may use Face++®, Skybiometry®, and other APIs or stand-alone, cloud-based services to complete a face matching process using the verification data 126A and the user application data 114. The matching algorithm 120A may include the following logic to return a matching score 120C to the drone control system 112 or other component and verify a user identity. Where the system 100 employs imaging and face recognition technology, the matching algorithm 120A may be implemented substantially as below:

```
Struct SubImage
{
  int xOffset;   // offset from overall image
  int yOffset;   // Y offset from overall image
  Image image;
}
// Runs on the drone processor or other component of the system 100
Int MatchFace(Image docFace, GeoLocation where)
{
  int score = 0;
  drone.flyTo(where);                 // go to the location first
  // Rotate the drone in XY plan in 30 degree increments
  for (int i=0; i < 360 && score < FACE_MATCH_THRESHOLD;
I += 30)
  {
    drone.pointNorth(i);    // pass the number of degrees from
north
    Image image = drone.takePicture( );
    if (image.hasFaces( ))
    {
      SubImages faces = image.getFaces( );   // pull a set of faces
      from image
      for (SubImage face : face)
      {
        int score = compare(docFace, face.image);
        while (int j = 0; j < MAX_ATTEMPTS &&
              score > FACE_SUSPECT_THRESHOLD &&
              score < FACE_MATCH_THRESHOLD; j++)
        {
          float zoom = j/10;   // zoom in xx%
          drone.zoomCamera(zoom, face.x, face.y);     // zoom
in on the face and try again
          Image tImage = drone.takePicture( );
          SubImages tFace = tImage.getFaces( );   // pull a set of
          faces from image
          score = compare(docFace, tFace.image);
        } // while
        if (score > FACE_MATCH_THRESHOLD) return
          score;      // done
      } // for
    } // hasFaces
  }  // for
  return score;
}
```

Upon verifying the user identity, the system 100 may generate a new user issuer account 165A. For example, generating the new user issuer account 165A may also cause the account generation module 116A, the payment network module 162, or other component of the system 100 to generate a token 170 for storage at the user computer system 104 in association with the issuer system module 105E. The token 170 may be encrypted information which allows the user computer system 104 generally and the issuer system module 105E in particular to communicate sensitive information (e.g., an identifier that may be mapped to a personal account number or "PAN", etc.) to other components of the system (e.g., the payment network system 108) to facilitate payment by the user to a merchant or other recipient from the payment network account 164A, the new user issuer account 165A, and other authorized components of the system 100. In some embodiments, only the payment network module 162 or other component of the payment network system 108 includes instructions to decipher the token 170 to facilitate the payment process. The drone system 110 may also include a printer device 129 that is able to print a payment device 200 (FIG. 2) for the new account holder upon completion of the identity verification and enrollment processes described herein. The drone system 110 may also be configured to deliver a payment device 200 at a later date or once a token is provisioned as described herein.

The payment network system 108 may include a payment network server 156 including a processor 158 and memory 160. The memory 160 may include a payment network module 162 including instructions to facilitate payment between parties (e.g., one or more users, merchants, etc.) using the system 100 and the new user issuer account 165A. The module 162 may be communicably connected to an account holder data repository 164 including a payment network account 164A and the issuer system 106. The payment network account 164A may include any data to facilitate payment and other funds transfers between system entities (i.e., a user, a merchant, the issuer, etc.). For example, the payment network account 164A may include application data, cumulative account transaction history data, payment device data, etc. Data may be shared between the issuer system 106 and the payment network system 108 including the new user issuer account data 165A as verified using the drone control system 112 and the drone system 110. The module 162 may also include instructions to send payment messages 166 to other entities and components of the system 100 in order to complete transactions between users and/or merchants.

Figure 2A:
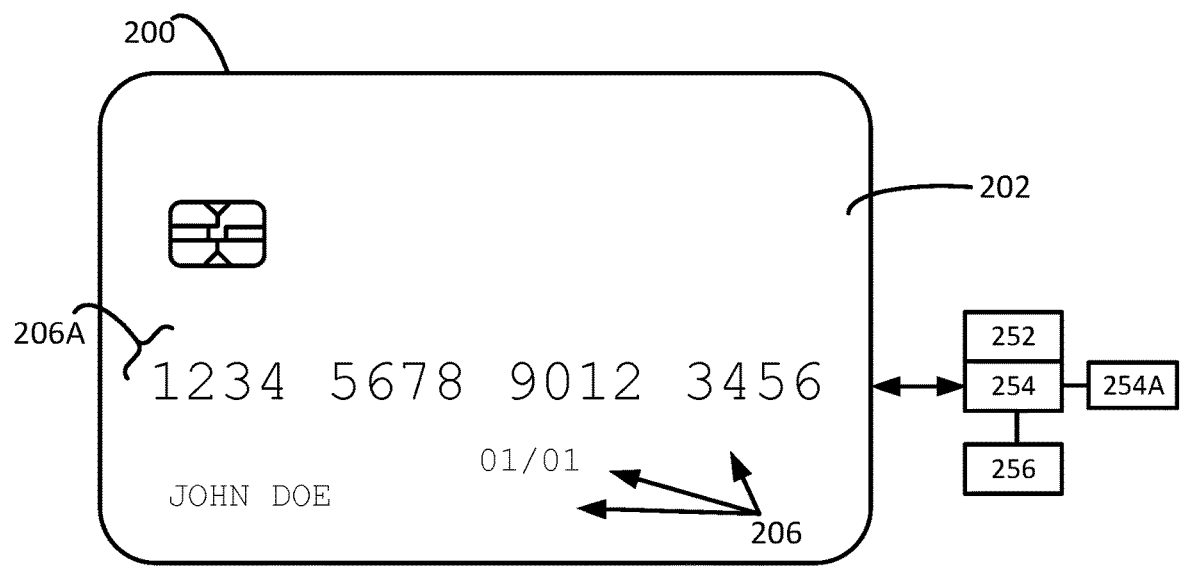
FIGS. 2A and 2B show an example payment device.
Figure 2B:
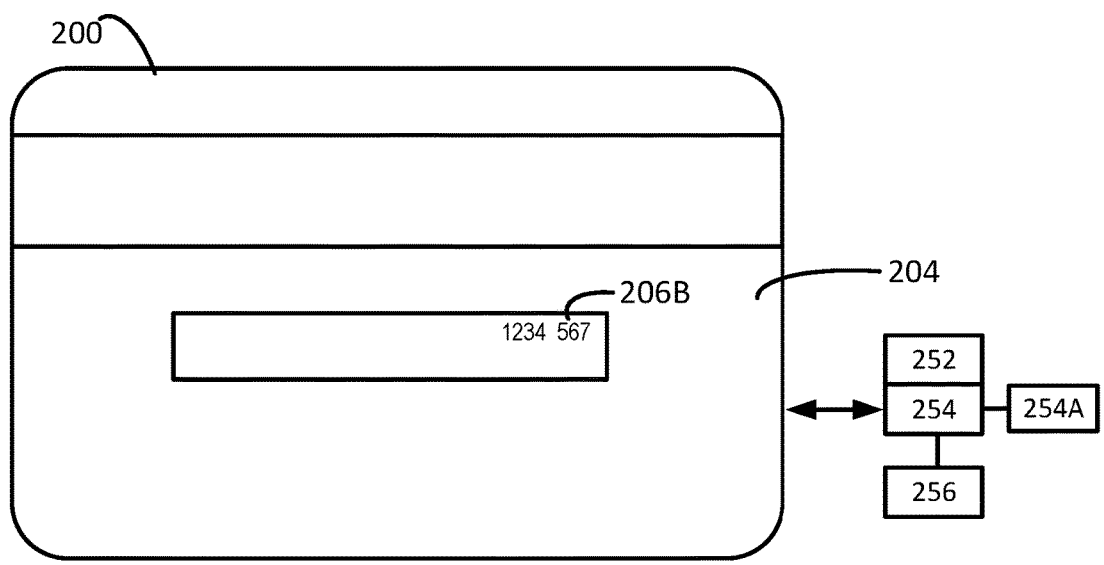

With brief reference to FIGS. 2A and 2B, an exemplary payment device 200 may take on a variety of shapes and forms. In some embodiments, the payment device 200 is a traditional card such as a debit card or credit card. In other embodiments, the payment device 200 may be a fob on a key chain, an NFC wearable, or other device. In other embodiments, the payment device 200 may be an electronic wallet where one account from a plurality of accounts previously stored in the wallet is selected and communicated to the system 100 to execute a transaction. As long as the payment device 200 is able to communicate securely with the system 100 and its components, the form of the payment device 200 may not be especially critical and may be a design choice. For example, many legacy payment devices may have to be read by a magnetic stripe reader and thus, the payment device 200 may have to be sized to fit through a magnetic card reader. In other examples, the payment device 200 may communicate through near field communication and the form of the payment device 200 may be virtually any form. Of course, other forms may be possible based on the use of the card, the type of reader being used, etc.

Physically, the payment device 200 may be a card and the card may have a plurality of layers to contain the various elements that make up the payment device 200. In one embodiment, the payment device 200 may have a substantially flat front surface 202 and a substantially flat back surface 204 opposite the front surface 202. Logically, in some embodiments, the surfaces 202, 204 may have some embossments 206 or other forms of legible writing including a personal account number (PAN) 206A and the card verification number (CVN) 206B. In some embodiments, the payment device 200 may include data corresponding to the primary account holder, such as profile data 164A for the account holder. A memory 254, generally, and a module 254A, in particular, may be encrypted such that all data related to payment is secure from unwanted third parties. A communication interface 256 may include instructions to facilitate sending payment data as a payment payload, a payment token, or other data to identify payment information to one or more components of the system 100 via the network 102.

Figure 3:
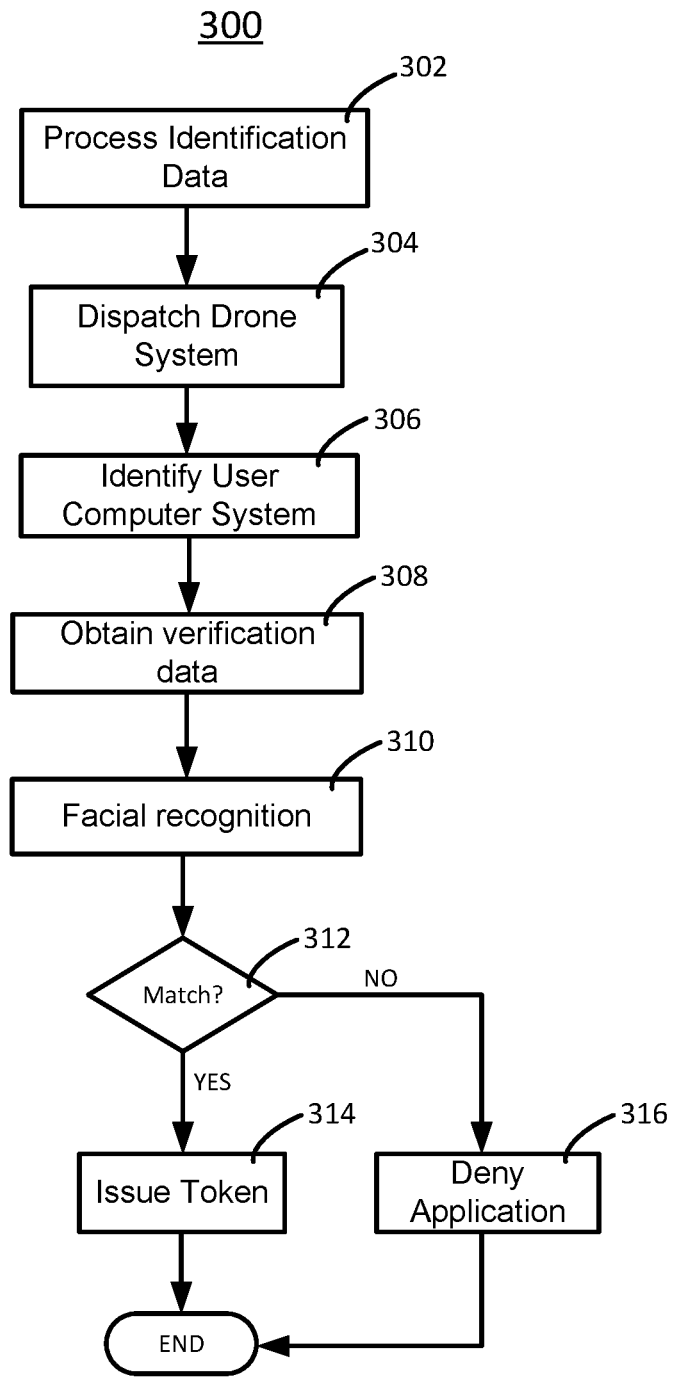
FIG. 3 is a flowchart of a method of verifying an account using the drone-based verification system.

FIG. 3 is a flowchart of a method 300 for verification of new account information employing a drone system 110, as described in relation to the system 100 of FIG. 1. Each step of the method 300 may be stored in a memory and executed on a processor of a server or other computing device of the system 100 which may be physically configured to execute the different aspects of the method. Each step may include execution of any of the instructions as described in relation to the system 100. While the below blocks are presented as an ordered set, the various steps described may be executed in any particular order to complete the identification verification methods described herein.

At block 302, the method 300 may process application data 114 received from the user computer system 104 as part of an account enrollment or other process with the issuer system 106. For example, the application data 114 may be used to facilitate identity verification to create a payment network account 164A and/or a new user issuer account 165A. In some embodiments, the application data 114 includes identification data 114A as well as geolocation data 1146 corresponding to a location at which the image was taken. The method 300 may determine the geolocation data 114B from the application data 114. The method 300 may also pass the application data 114 to the issuer computer system 106, which then passes the application data to the drone control system 112 or other component of the system 100. In embodiments, the issuer system 106 may also pass the geolocation data 114B or other data from the application data 114 (e.g., a customer name, address, current location, mobile phone number, a MAC address for the device that took and/or sent the image, an SSID, a URL, an IP address, etc.) to a risk management system to determine whether the data 114 may be associated with fraudulent activity before proceeding to the next step.

At block 304, using the application data 114, the drone control system 112 may dispatch a drone system 110 to the geolocation indicated by the application data 114. Using the geolocation data 114B, the drone control module 136 may cause the drone system 110 to fly to the location indicated by the geolocation data 114B. In embodiments where the issuer system module 105E includes Bluetooth® Low Energy (BLE) functionality, the module 105E may cause the user computer system 104 to enable BLE and broadcast a one-time password (OTP) for identification by the drone system 110. When employing BLE, the data retrieval protocol 120 may cause the drone system 110 to seek a one-time password (OTP) that is broadcast by the user computer system 104 and the BLE signal from the user computer system 104 that sent the application data 114.

At block 306, the method 300 may identify the user computer system 104 that sent the application data 114 by one or more of the geolocation data 114B, and a BLE/OTP matching process.

At block 308, the drone control module 136 may cause the drone system 110 to obtain the verification data 126A. In some embodiments, the type of the verification data 126A is identical to the type of the identification data 114A. For example, if the identification data 114A includes a photo, then the verification data 126A will also be a photo. As another example, if the identification data 114A includes an iris scan or a blood sample, then the verification data 126A will also be an iris scan or blood sample. Further, the drone system 110 may employ the data receiving device 128 to take a picture of a user corresponding to the geolocation data 114B and/or the BLE/OTP matching process for the verification data 126A. In other embodiments, the data receiving device 128 may take a photo of an identification document that was previously submitted to the issuer system 106 by the user computer system 104. Where the geolocation includes multiple possible users (e.g., a crowd of people), then the method 300 may iterate over each face in the group. In other embodiments, the method 300 may only iterate over each face in the crowd until the drone system 110 moves beyond a threshold distance of the geolocation data 114B or loses contact with a BLE/OTP signal.

At block 310, the method 300 may employ a facial recognition process using the verification data 126A captured by the drone system 110 and the user application data 114 received by the issuer computer system 106. In some embodiments, a matching algorithm 120A may be employed by the drone system 110 or another component of the system, 100, as described above.

At block 312, the method 300 may determine if the verification data 126A captured by the drone system 110 and the user application data 114 received by the issuer computer system 106 match. In some embodiments, the matching algorithm 120A may determine a score by comparing the application data 114 to the verification data 126A. The score may indicate a degree of similarity between data received during the online application process and during the drone system verification process and a probability of a match. For example, when a score from the algorithm 120A is above a threshold, then the user application data 114 and the verification data 126A 120C captured by the data receiving device 128 have a high probability of being images of the same person.

When the score exceeds a threshold, then the method 300 may continue to block 314. At block 314, the method 300 may issue a PAN and cause the token 170 to be saved to the user computing system 104 without exposing the PAN. When the score does not exceed the threshold, then the method 300 may deny the new account application request at block 316, and end.

Thus, systems and methods described herein provide a technical solution to the technical problem of authenticating physical identity in an online context. For example, the systems and methods described herein may verify new users for payment devices 200 where fast, accurate, and secure verification is required. In addition or alternatively, the systems and methods described herein may be used as a federation provider within a network where certain entities are identity providers. For example, in a payment network, an issuer may be an identity provider while in a medical context, an insurance company or employer could be the identity provider, but the systems and methods described herein would provide federation across the identity providers (insurance companies) and service providers (e.g., doctors, hospitals, etc.). Existing systems and methods require in-person verification by visiting a bank or other institution to complete an application process and verify identity. The systems and methods described herein improve on existing in-person techniques by providing a fast and low-friction solution for new account verification that may be completed entirely online.

Figure 4:
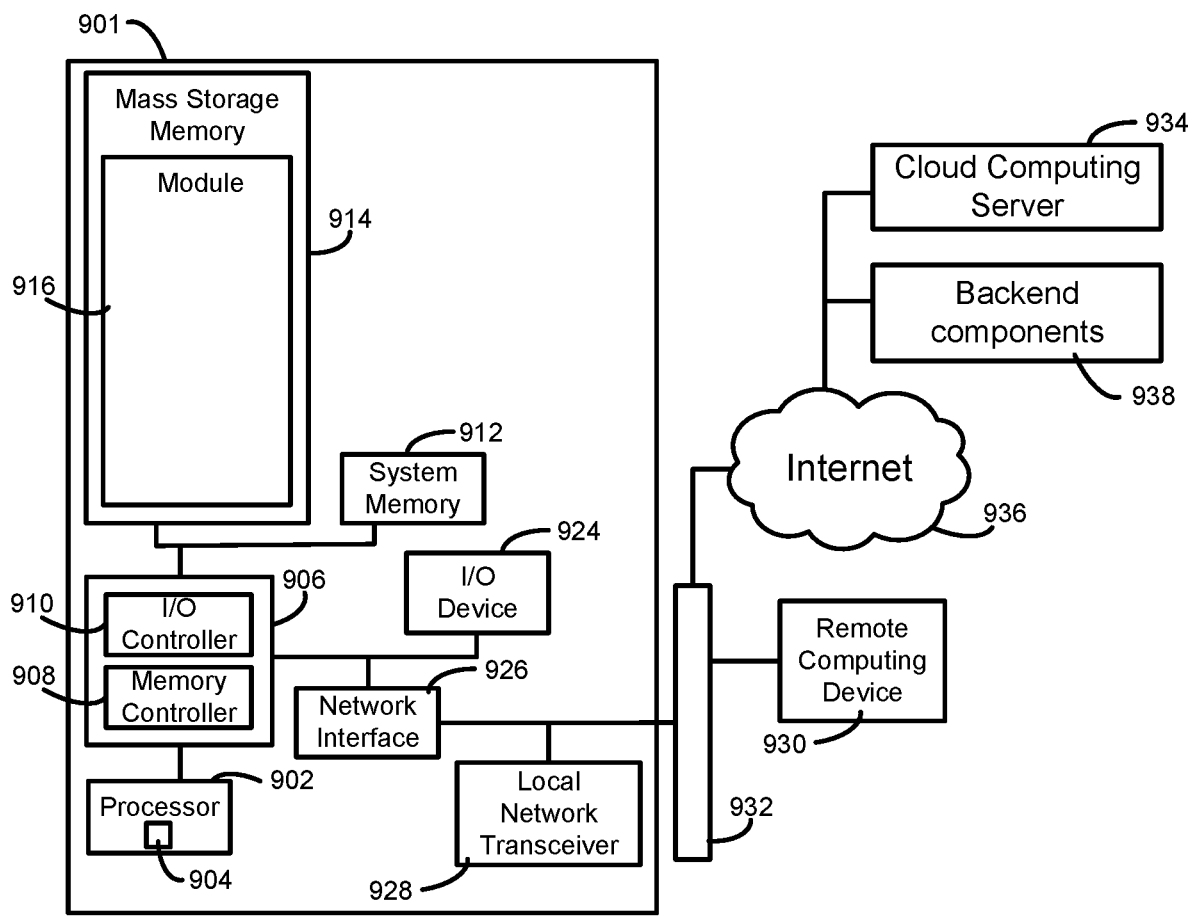
FIG. 4 shows an exemplary computing device that may be physically configured to execute the methods and include the various components described herein.

FIG. 4 is a high-level block diagram of an example computing environment 400 for the system 100 and methods (e.g., method 300) as described herein. The computing device 400 may include a server (e.g., the issuer server 108, drone control server 130, payment network server 156, etc.) mobile computing device (e.g., user computing system 104), a cellular phone, a tablet computer, a Wi-Fi-enabled device or other personal computing device capable of wireless or wired communication), a thin client, or other known type of computing device.

Logically, the various servers may be designed and built to specifically execute certain tasks. For example, the payment network server 156 may receive a large amount of data in a short period of time meaning the payment server may contain a special, high speed input output circuit to handle the large amount of data. Similarly, the issuer server 108 may have increased processing power that is specially adapted to quickly execute the instructions, blocks, methods, etc., described herein.

As will be recognized by one skilled in the art, in light of the disclosure and teachings herein, other types of computing devices can be used that have different architectures. Processor systems similar or identical to the example systems and methods described herein may be used to implement and execute the example systems and methods described herein. Although the example system 100 is described below as including a plurality of peripherals, interfaces, chips, memories, etc., one or more of those elements may be omitted from other example processor systems used to implement and execute the example systems and methods. Also, other components may be added.

As shown in FIG. 4, the computing device 901 includes a processor 902 that is coupled to an interconnection bus. The processor 902 includes a register set or register space 904, which is depicted in FIG. 4 as being entirely on-chip, but which could alternatively be located entirely or partially off-chip and directly coupled to the processor 902 via dedicated electrical connections and/or via the interconnection bus. The processor 902 may be any suitable processor, processing unit or microprocessor. Although not shown in FIG. 4, the computing device 901 may be a multi-processor device and, thus, may include one or more additional processors that are identical or similar to the processor 902 and that are communicatively coupled to the interconnection bus.

The processor 902 of FIG. 4 is coupled to a chipset 906, which includes a memory controller 908 and a peripheral input/output (I/O) controller 910. As is well known, a chipset typically provides I/O and memory management functions as well as a plurality of general purpose and/or special purpose registers, timers, etc. that are accessible or used by one or more processors coupled to the chipset 906. The memory controller 908 performs functions that enable the processor 902 (or processors if there are multiple processors) to access a system memory 912 and a mass storage memory 914, that may include either or both of an in-memory cache (e.g., a cache within the memory 912) or an on-disk cache (e.g., a cache within the mass storage memory 914).

The system memory 912 may include any desired type of volatile and/or non-volatile memory such as, for example, static random access memory (SRAM), dynamic random access memory (DRAM), flash memory, read-only memory (ROM), etc. The mass storage memory 914 may include any desired type of mass storage device. For example, the computing device 901 may be used to implement a module 916 (e.g., the various modules as herein described). The mass storage memory 914 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 901, the systems and methods described herein. Thus, a module, block, function, operation, procedure, routine, step, and method can be implemented in hardware, firmware, and/or software. In one embodiment, program modules and routines are stored in mass storage memory 914, loaded into system memory 912, and executed by a processor 902 or can be provided from computer program products that are stored in tangible computer-readable storage mediums (e.g. RAM, hard disk, optical/magnetic media, etc.).

The peripheral I/O controller 910 performs functions that enable the processor 902 to communicate with a peripheral input/output (I/O) device 924, a network interface 926, a local network transceiver 928, (via the network interface 926) via a peripheral I/O bus. The I/O device 924 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 924 may be used with the module 916, etc., to receive data from the transceiver 928, send the data to the components of the system 100, and perform any operations related to the methods as described herein. The local network transceiver 928 may include support for a Wi-Fi network, Bluetooth, Infrared, cellular, or other wireless data transmission protocols. In other embodiments, one element may simultaneously support each of the various wireless protocols employed by the computing device 901. For example, a software-defined radio may be able to support multiple protocols via downloadable instructions. In operation, the computing device 901 may be able to periodically poll for visible wireless network transmitters (both cellular and local network) on a periodic basis. Such polling may be possible even while normal wireless traffic is being supported on the computing device 901. The network interface 926 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 908 and the I/O controller 910 are depicted in FIG. 4 as separate functional blocks within the chipset 906, the functions performed by these blocks may be integrated within a single integrated circuit or may be implemented using two or more separate integrated circuits. The computing environment 900 may also implement the module 916 on a remote computing device 930. The remote computing device 930 may communicate with the computing device 901 over an Ethernet link 932. In some embodiments, the module 916 may be retrieved by the computing device 901 from a cloud computing server 934 via the Internet 936. When using the cloud computing server 934, the retrieved module 916 may be programmatically linked with the computing device 901. The module 916 may be a collection of various software platforms including artificial intelligence software and document creation software or may also be a Java® applet executing within a Java® Virtual Machine (JVM) environment resident in the computing device 901 or the remote computing device 930. The module 916 may also be a "plug-in" adapted to execute in a web-browser located on the computing devices 901 and 930. In some embodiments, the module 916 may communicate with back end components 938 via the Internet 936.

The system 900 may include but is not limited to any combination of a LAN, a MAN, a WAN, a mobile, a wired or wireless network, a private network, or a virtual private network. Moreover, while only one remote computing device 930 is illustrated in FIG. 4 to simplify and clarify the description, it is understood that any number of client computers are supported and can be in communication within the system 900.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A computer-implemented method of verifying application data comprising:
receiving application data from a remote computer system at an issuer computer system;
analyzing the application data to determine whether the application data is associated with fraudulent activity at the issuer computer system;
determining identification data and geolocation data from the application data;
passing the geolocation data to a drone control system that is remote from the issuer computer system;
causing a drone system to be dispatched to a location matching the geolocation data;
causing the drone system to capture verification data at the location, wherein a type of the verification data is identical to a type of the identification data;

receiving an indication of a match between the identification data and the verification data; and issuing a token via the issuer computer system, wherein the token includes an encrypted identifier mapped to a personal account number.

2. The method of claim 1, wherein the geolocation data corresponds to a location at which the verification data was captured using the remote computer system.

3. The method of claim 2, further comprising enabling a short-range communication protocol at the remote computer system in response to causing the drone system to be dispatched to the location.

4. The method of claim 3, wherein enabling the short-range communication protocol includes enabling a Bluetooth® Low Energy protocol and broadcasting a one-time password from the remote computer system to the drone system.

5. The method of claim 4, further comprising identifying the remote computer system at the drone system in response to receiving the one-time password.

6. The method of claim 5, wherein causing the drone system to capture verification data at the location includes causing the drone system to take a photo at the location.

7. The method of claim 6, wherein the photo includes an image of one or more of an identification document and a new user and the image corresponds to the identification data.

8. The method of claim 7, wherein receiving the indication of the match between the identification data and the verification data includes employing a facial recognition process using both the identification data and the verification data and determining that the identification data and the verification data include an image of the same person.

9. The method of claim 8, wherein determining that the identification data and the verification data include the image of the same person further includes calculating a score that indicates a degree of similarity between a subject of the identification data and the verification data.

10. A system for verifying new user identification in a network data system comprising:

an issuer system including a first processor and a first memory hosting an issuer account generation module and a verification module, wherein the issuer account generation module and the verification module include instructions stored on the first memory for execution by the first processor for:

receiving application data from a user computer system that is remote from the issuer system;

analyzing the application data to determine whether the application data is associated with fraudulent activity;

determining identification data and geolocation data from the application data;

passing the geolocation data to a drone control system that is remote from the issuer system;

causing a drone system to be dispatched to a location matching the geolocation data;

causing the drone system to capture verification data at the location, wherein a type of the verification data is identical to a type of the identification data;

receiving an indication of a match between the identification data and the verification data; and issuing a token, wherein the token includes an encrypted identifier mapped to a personal account number.

11. The system of claim 10, further comprising:

a payment network system including a second processor and a second memory hosting a payment network module, wherein the payment network module includes instructions stored on the second memory for execution by the second processor for:

generating the token based on the indication of the match between the identification data and the verification data; and causing the token to be saved at the user computer system, wherein the token includes an encrypted identifier mapped to a personal account number.

12. The system of claim 11, wherein the geolocation data corresponds to a location at which the verification data was captured using the remote computer system.

13. The system of claim 12, wherein the verification module includes further instructions for enabling a short-range communication protocol at the user computer system in response to causing the drone system to be dispatched to the location.

14. The system of claim 13, wherein the instructions for enabling the short-range communication protocol include instructions for enabling a Bluetooth® Low Energy protocol and broadcasting a one-time password from the user computer system to the drone system.

15. The system of claim 14, further comprising the drone system, wherein the drone system includes a third processor and a third memory including instructions for execution by the third processor for identifying the user computer system at the drone system in response to receiving the one-time password.

16. The system of claim 15, wherein the instructions for causing the drone system to obtain verification data at the location include instructions for causing the drone system to take a photo at the location.

17. The system of claim 16, wherein the photo includes an image of one or more of an identification document and a new account user and the image corresponds to the identification data from the application data.

18. The system of claim 17, wherein the instructions for receiving the indication of the match between the application data and the verification data include instructions for employing a facial recognition process using the application data and the verification data and determining that the identification data and the verification data include an image of the same person.

19. The system of claim 18, wherein the instructions for determining that the identification data and the verification data include the image of the same person further include calculating a score that indicates a degree of similarity between a subject of the application data and the verification data.

* * * * *